(12) United States Patent
Johnson et al.

(10) Patent No.: US 8,451,909 B1
(45) Date of Patent: May 28, 2013

(54) SYSTEM AND METHOD FOR DYNAMICALLY CHANGING QUALITY LEVELS AMONG A PLURALITY OF VIDEO SCENES

(75) Inventors: Alexander Steven Johnson, Erie, CO (US); Marc-Antoine Lamontagne, St-Eustache (CA); Mark Whiffen, Kirkland (CA)

(73) Assignee: Verint Americas, Inc., Alpharetta, GA (US)

( * ) Notice: Subject to any disclaimer, the term of this patent is extended or adjusted under 35 U.S.C. 154(b) by 744 days.

(21) Appl. No.: 12/643,559

(22) Filed: Dec. 21, 2009

Related U.S. Application Data

(60) Provisional application No. 61/140,274, filed on Dec. 23, 2008.

(51) Int. Cl.
*H04N 7/12* (2006.01)

(52) U.S. Cl.
USPC .................................................. 375/240.26

(58) Field of Classification Search
USPC ........................................ 375/240.01–240.29
See application file for complete search history.

(56) References Cited

U.S. PATENT DOCUMENTS

| | | | |
|---|---|---|---|
| 2005/0163212 A1* | 7/2005 | Henson et al. | 375/240.01 |
| 2005/0169367 A1* | 8/2005 | Venetianer et al. | 375/240.01 |
| 2006/0053459 A1* | 3/2006 | Simerly et al. | 725/105 |

* cited by examiner

*Primary Examiner* — Charles C Jiang
(74) *Attorney, Agent, or Firm* — Meunier Carlin & Curfman, LLC

(57) ABSTRACT

A method for operating a video system is provided. The method includes receiving video data of a first scene and a second scene, processing at least a first portion of the video data to generate a first video of the first scene having a first quality level, processing at least a second portion of the video data to generate a second video of the second scene having a second quality level, and processing at least a third portion of the video data to detect an occurrence of an event in the first scene. In response to detecting the occurrence of the event in the first scene, the method continues by processing at least a fourth portion of the video data to generate a third video of the first scene at a third quality level, where the third quality level is different than the first quality level, and transferring the third video for display.

18 Claims, 10 Drawing Sheets

SYSTEM AND METHOD FOR DYNAMICALLY CHANGING QUALITY LEVELS AMONG A PLURALITY OF VIDEO SCENES

RELATED APPLICATIONS

This application relates to and claims priority to U.S. Patent Application No. 61/140,274, filed on Dec. 23, 2008, entitled SYSTEM AND METHOD FOR DYNAMICALLY CHANGING QUALITY LEVELS AMONG A PLURALITY OF VIDEO SCENES, which is hereby incorporated by reference in its entirety.

TECHNICAL FIELD

Aspects of this invention are related in general to the field of video analytics. In particular, aspects of this invention are related to dynamically changing quality levels among a plurality of video scenes.

TECHNICAL BACKGROUND

Some current video systems include provisions for the display of multiple video streams containing different scenes captured by a plurality of video capture devices. Often these scenes are tiled together into a single video feed for display. Typically, when multiple scenes are tiled together, they are not displayed at their maximum quality level. For example, when four scenes are tiled together, each scene may be displayed at lower quality level having a scale one quarter of that of the native video of the scene. This allows four of the scenes to be displayed in an area equivalent to any one of the individual scenes at full scale.

When large numbers of videos of different scenes are tiled together such that 16 or more scenes are displayed at the same time, the reduction in size of each of the scenes makes the detection of significant events in any of the scenes difficult. Typically, a user is able to select any one of the videos of different scenes for close inspection at a high quality level. However, the user must determine which scene to examine, and the user may not be able to detect significant events requiring attention due to the small size of each of the multiple scenes as displayed in a large tile.

OVERVIEW

In an embodiment, a method for operating a video system is provided. The method includes receiving video data of a first scene and a second scene, processing at least a first portion of the video data to generate a first video of the first scene having a first quality level, processing at least a second portion of the video data to generate a second video of the second scene having a second quality level, and processing at least a third portion of the video data to detect an occurrence of an event in the first scene. In response to detecting the occurrence of the event in the first scene, the method continues by processing at least a fourth portion of the video data to generate a third video of the first scene at a third quality level, where the third quality level is different than the first quality level, and transferring the third video for display.

In another embodiment, the method includes combining the first video at the first quality level, the second video at the second quality level, and the third video at the third quality level into a tiled video, where the first video and second video have a first size and the third video has a second size, where the second size is larger than the first size, and transferring the tiled video for display.

In a further embodiment, the method includes transferring the second video for display simultaneously with transferring the third video for display. In another embodiment, the first quality level has a first compression level, the second quality level has a second compression level, the third quality level has a third compression level, and the third compression level is less than the first compression level.

In a further embodiment, the first quality level has a first frame rate, the second quality level has a second frame rate, the third quality level has a third frame rate, and the third frame rate is greater than the first frame rate. In another embodiment, the first quality level has a first color space, the second quality level has a second color space, the third quality level has a third color space, and the third color space is larger than the first color space.

In a further embodiment, the first event is motion within the first scene. In another embodiment, the first event is a presence of an object of interest within the first scene. In a further embodiment, the first event is a presence of an object of interest within a selected region within the first scene. In another embodiment, the first event is an absence of an object of interest within a selected region within the first scene.

In a further embodiment, a video processing system including a communication interface configured to receive video data comprising a first scene and a second scene and a processing system is provided. The processing system is configured to process at least a first portion of the video data to generate a first video of the first scene having a first quality level, process at least a second portion of the video data to generate a second video of the second scene having a second quality level, and process at least a third portion of the video data to detect an occurrence of an event in the first scene.

In response to detecting the occurrence of the event in the first scene, the processing system is configured to process at least a fourth portion of the video data to generate a third video of the first scene at a third quality level, where the third quality level is different than the first quality level, and to transfer the third video through the communication interface for display.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
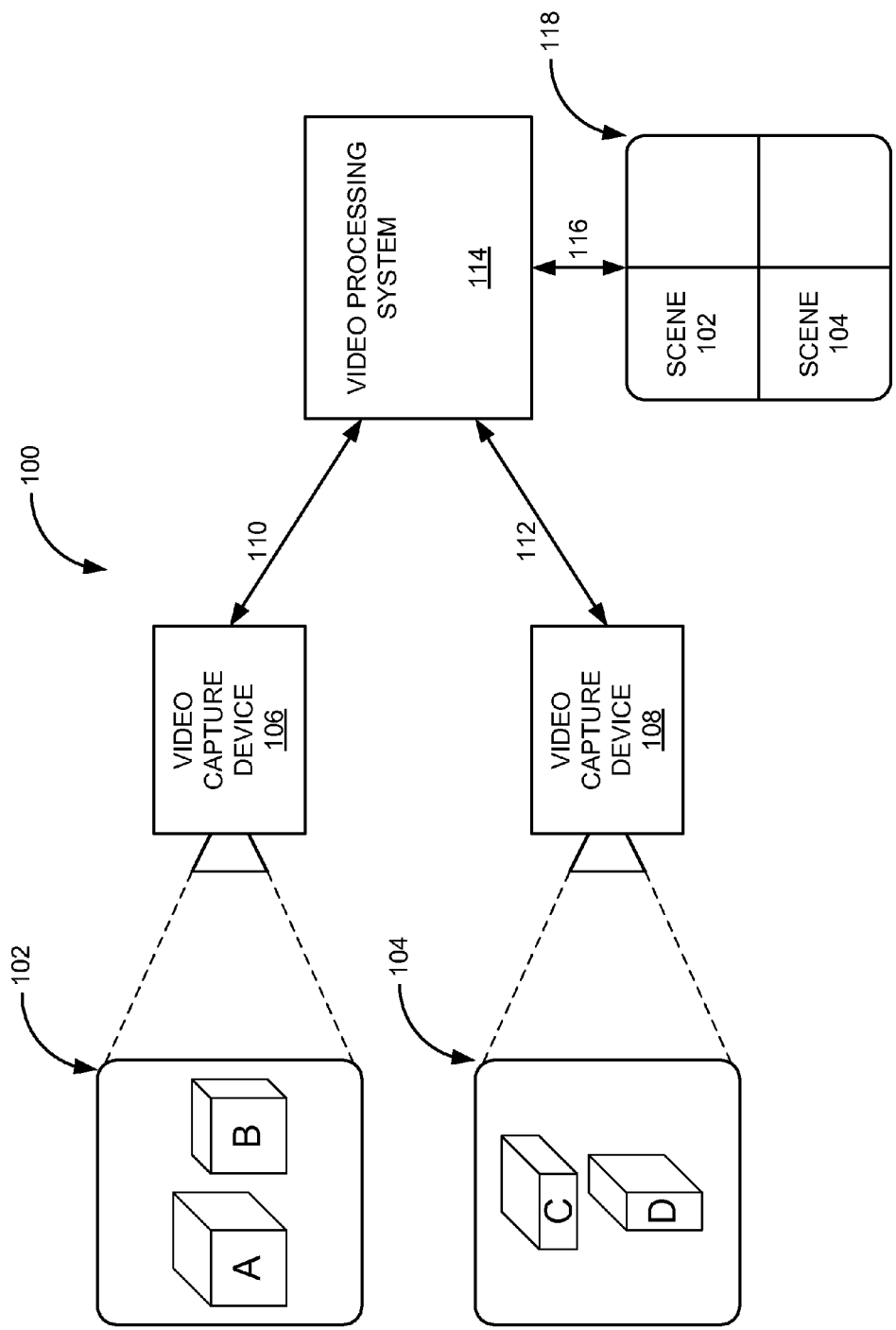
FIG. 1 is a block diagram illustrating a video system for dynamically changing quality levels among a plurality of video scenes.

FIG. 1 is a block diagram illustrating a video system for dynamically changing quality levels among a plurality of video scenes. In this example, a video system 100 includes video capture device 106, video capture device 108, video processing system 114, and display 118. Video capture device 106 is configured to capture video data of scene 102, and video capture device 108 is configured to capture video data of scene 104.

In this example, scene 102 contains object A and object B, while scene 104 contains object C and object D. Normally scenes are much more complex than scenes 102 and 104, however, for the purposes of illustration scenes 102 and 104 have been simplified.

Video capture devices 106 and 108 may be digital cameras or any other devices capable of capturing video data from scenes 102 and 104. Video processing system 114 may be any computer system, custom hardware, or other device configured to receive, process, and transmit video data. Display 118 may be any device capable of displaying one or more video data stream to a user.

Video processing system 114 is connected to video capture device 106 through link 110, and to video capture device 108 through link 112. Display 118 is connected to video processing system 114 through link 116.

Links 110, 112, and 116 may use any of a variety of communication media, such as air, metal, optical fiber, or any other signal propagation path, including combinations thereof. Also, links 110, 112, and 116 may use any of a variety of communication protocols, such as internet, telephony, optical networking, wireless communication, wireless fidelity, or any other communication protocols and formats, including combinations thereof. Further, links 110, 112, and 116 could be direct links or they might include various intermediate components, systems, and networks.

In this example, video capture device 106 captures video data of scene 102 and transmits this video data to video processing system 114 over link 110. Video capture device 108 captures video data of scene 104 and transmits this video data to video processing system 114 over link 112. Video processing system 114 combines the videos from video capture devices 106 and 108 and transmits the combined video to display 118 over link 116. In this example, video of scene 102 is shown in the upper-left corner of display 118, while video of scene 104 is shown in the lower-left corner of display 118.

Video processing system 114 processes the video data from video capture devices 106 and 108 to detect an occurrence of an event in one of scenes 102 and 104. When an event has been detected, video processing system 114 processes the video data containing that scene to produce a high quality video of the scene containing the event. This high quality video is then transmitted to display 118 over link 116. In other embodiments, video processing system 114 may send control signals to video capture devices 106 and 108 over links 110 and 112 instructing video capture devices 106 and 108 to process the video data containing that scene to produce a high quality video of the scene containing the event, and transmit this high quality video over links 110 and 112 to video processing system 114.

Figure 2:
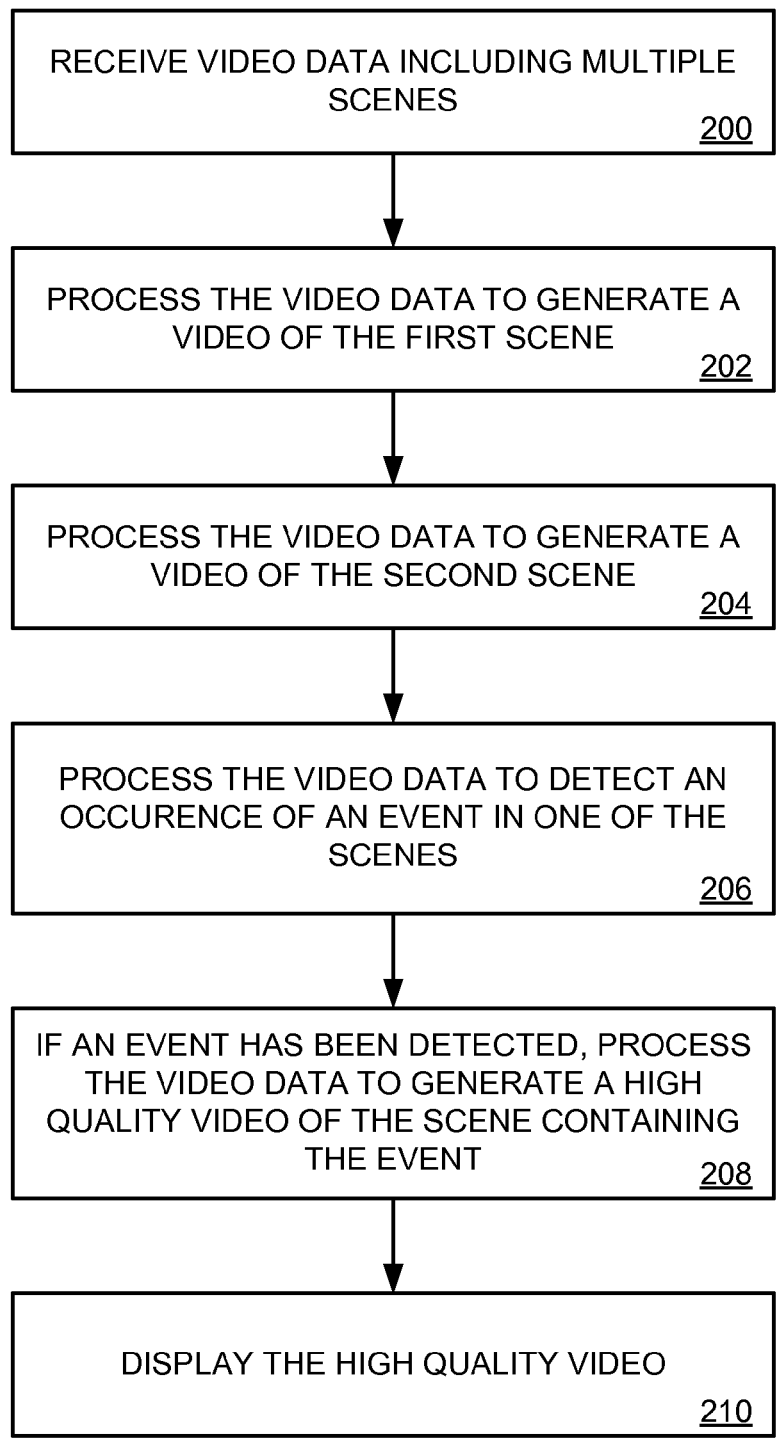
FIG. 2 is a flow diagram illustrating a method for dynamically changing quality levels among a plurality of video scenes.

FIG. 2 is a flow diagram illustrating a method for dynamically changing quality levels among a plurality of video scenes. In this example, video processing system 114 receives video data including multiple scenes from video capture devices 106 and 108 (operation 200). Video processing system 114 processes the video data to generate a video of scene 102 at a first quality level (operation 202). Video processing system 114 also processes the video data to generate a video of scene 104 at a second quality level (operation 204). The first and second quality levels may be identical in some examples.

Video processing system 114 processes the video data to detect an occurrence of an event in one of the scenes (operation 206). This event may be any of a wide variety of possible events. For example, the event may be motion within one of the scenes, the presence of an object of interest within one of the scenes, the presence of an object of interest within a selected region within one of the scenes, the absence of an object of interest within a selected region within one of the scenes, or the like. The object of interest may be anything detectable in the video such as a human, car, boat, dog, cat, or the like.

If an event has been detected, video processing system 114 processes the video data to generate a high quality video of the scene containing the event (operation 208) and transmits the high quality video to display 118 for display (operation 210). Quality levels may be determined in any of a wide variety of ways and may include any of a variety of different manifestations of quality. For example, low quality video may be video that has a high scale or compression level, while high quality video has a much lower scale or compression level. In other examples, low quality video may have a different color map than high quality video, as in the case where low quality video is transmitted in black and white, while high quality video is transmitted in color. Still other examples may include low quality video having a low frame rate, while high quality video has a higher frame rate. In some embodiments multiple manifestations of quality may be used within a single system. For example, high quality video may have both a higher frame rate and a lower compression ratio that low quality video.

In some examples, control signals may be sent to video capture devices 106 and 108 instructing them to change the quality level of the video data that they send to video processing system 114. For example, links 110 and 112 may be bi-directional and may carry both control signals and video data. In such an example, the operation of processing the video into high quality video may occur in video capture devices 106 and 108.

Figure 3:
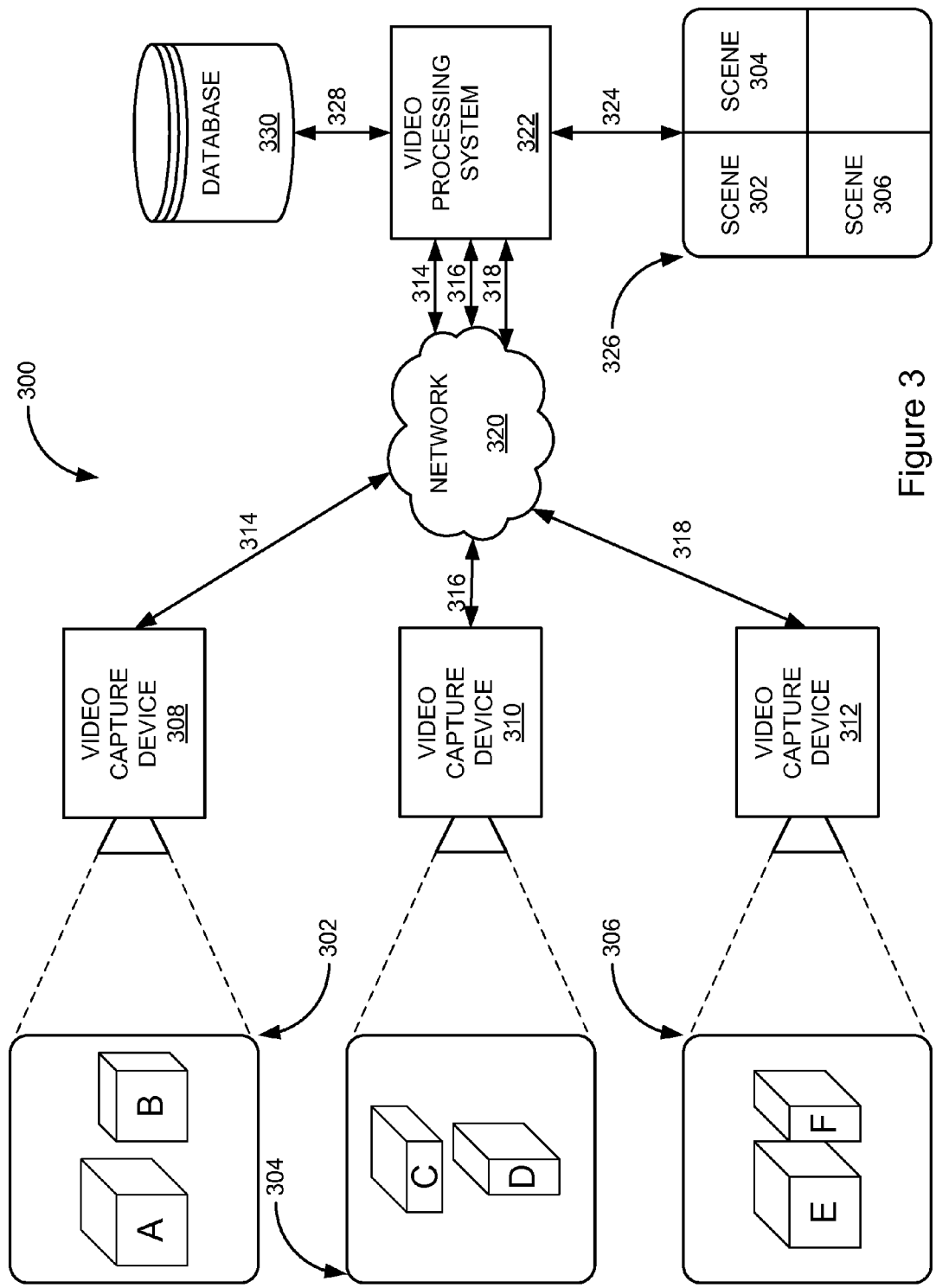
FIG. 3 is a block diagram illustrating a video system for dynamically changing quality levels among a plurality of video scenes.

FIG. 3 is a block diagram illustrating a video system for dynamically changing quality levels among a plurality of video scenes. In this example, a video system 300 includes video capture device 308, video capture device 310, video capture device 312, network 320, video processing system 322, database 330, and display 326. Video capture device 308 is configured to capture video data of scene 302, video capture device 310 is configured to capture video data of scene 304, and video capture device 312 is configured to capture video data of scene 306.

In this example, scene 302 contains object A and object B, scene 304 contains object C and object D, and scene 306 contains object E and object F. Normally scenes are much more complex than scenes 302, 304, and 306, however, for the purposes of illustration scenes 302, 304, and 306 have been simplified.

Video capture devices 308, 310, and 312 may be digital cameras or any other devices capable of capturing video data from scenes 302, 304, and 306. Video processing system 322 may be any computer system, custom hardware, or other device configured to receive, process, and transmit video data. Display 326 may be any device capable of displaying one or more video data stream to a user.

Video processing system 322 is connected to video capture device 308 through link 314, video capture device 310 through link 316, and to video capture system 312 through link 318. Links 314, 316, and 318 all include network 320. Display 326 is connected to video processing system 322 through link 324.

Links 314, 316, 318, 324, and 328 may use any of a variety of communication media, such as air, metal, optical fiber, or any other signal propagation path, including combinations thereof. Also, links 314, 316, 318, 324, and 328 may use any of a variety of communication protocols, such as internet, telephony, optical networking, wireless communication, wireless fidelity, or any other communication protocols and formats, including combinations thereof. Further, links 314, 316, 318, 324, and 328 could be direct links or they might include various intermediate components, systems, and networks. In this example links 314, 316, and 318 all include network 320.

In this example, video capture device 308 captures video data of scene 302 and transmits this video data to video processing system 322 over link 314. Video capture device 310 captures video data of scene 304 and transmits this video data to video processing system 322 over link 316. Video capture device 312 captures video data of scene 306 and transmits this video data to video processing system 322 over link 318. Video processing system 322 combines the videos from video capture devices 308, 310, and 312 and transmits the combined video to display 326 over link 324. In this example, video of scene 302 is shown in the upper-left corner of display 326, video of scene 304 is shown in the upper-right corner of display 326, and video of scene 306 is shown in the lower-left corner of display 326.

Video processing system 322 processes the video data from video capture devices 308, 310, and 312 to detect an occurrence of an event in one of scenes 302, 304, and 306. When an event has been detected, video processing system 322 processes the video data containing that scene to produce a high quality video of the scene containing the event. This high quality video is then transmitted to display 326 over link 324.

Figure 4:
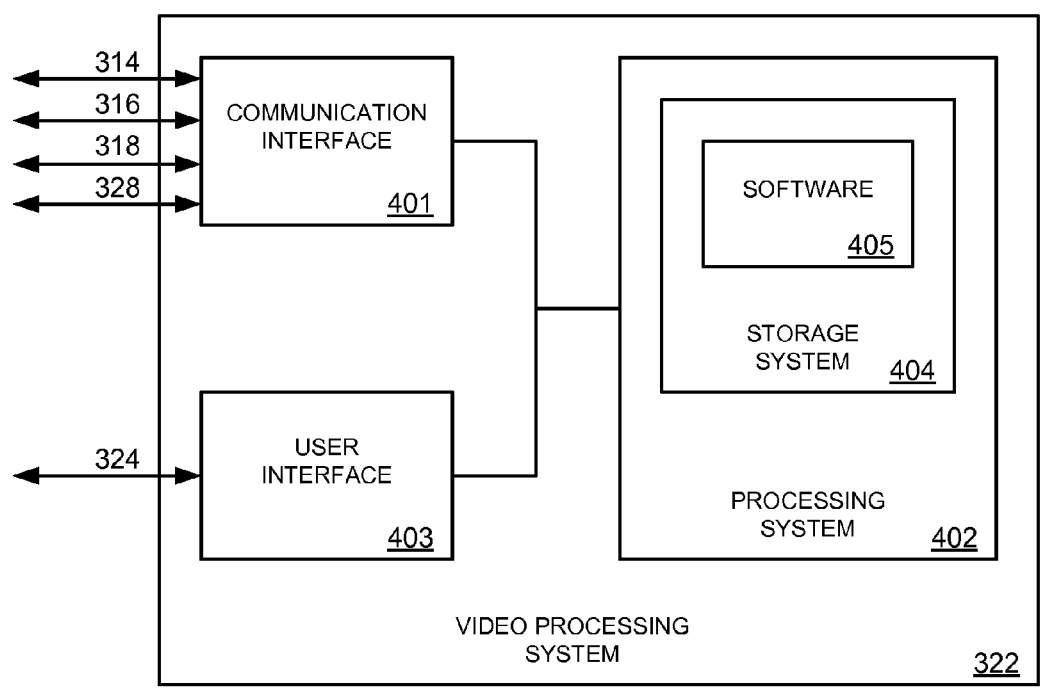
FIG. 4 is a block diagram illustrating a video processing system for dynamically changing quality levels among a plurality of video scenes.

FIG. 4 is a block diagram illustrating a video processing system for dynamically changing quality levels among a plurality of video scenes. Video processing system 322 includes communication interface 401, processing system 402, and user interface 403. Processing system 402 includes storage system 404. Storage system 404 stores software 405. Processing system 402 is linked to communication interface 401 and user interface 403. Video processing system 322 could include a programmed general-purpose computer, although those skilled in the art will appreciate that programmable or special purpose circuitry and equipment may be used. Video processing system 322 may be distributed among multiple devices that together make up elements 401-405. Video processing system 114 from FIG. 1 may have a structure similar to that illustrated in FIG. 4 with respect to video processing system 322.

Communication interface 401 could include a network interface, modem, port, transceiver, or some other communication device. Communication interface 401 may be distributed among multiple communication devices. Communication interface 401 may be configured to receive video from video capture device 308 over link 314, from video capture device 310 over link 316, and from video capture device 312 over link 318. Optionally, communication interface 401 may be configured to send control signals to video capture devices 308, 310, and 312 over links 314, 316, and 318, respectively. Communication interface 401 may also be configured to store and retrieve video data in database 330 over link 328. Processing system 402 could include a computer microprocessor, logic circuit, or some other processing device. Processing system 402 may be distributed among multiple processing devices. User interface 403 could include a keyboard, mouse, voice recognition interface, microphone and speakers, graphical display, touch screen, or some other type of user device. User interface 403 may be configured to send video data to display 326 over link 324. User interface 403 may be distributed among multiple user devices. Storage system 404 could include a disk, tape, integrated circuit, server, or some other memory device. Storage system 404 may be distributed among multiple memory devices. Storage system 404 optionally may be configured to operate as database 330.

Processing system 402 retrieves and executes software 405 from storage system 404. Software 405 may include an operating system, utilities, drivers, networking software, and other software typically loaded onto a computer system. Software 405 could include an application program, firmware, or some other form of machine-readable processing instructions. When executed by processing system 402, software 405 directs processing system 402 to operate as described herein.

Figure 5:
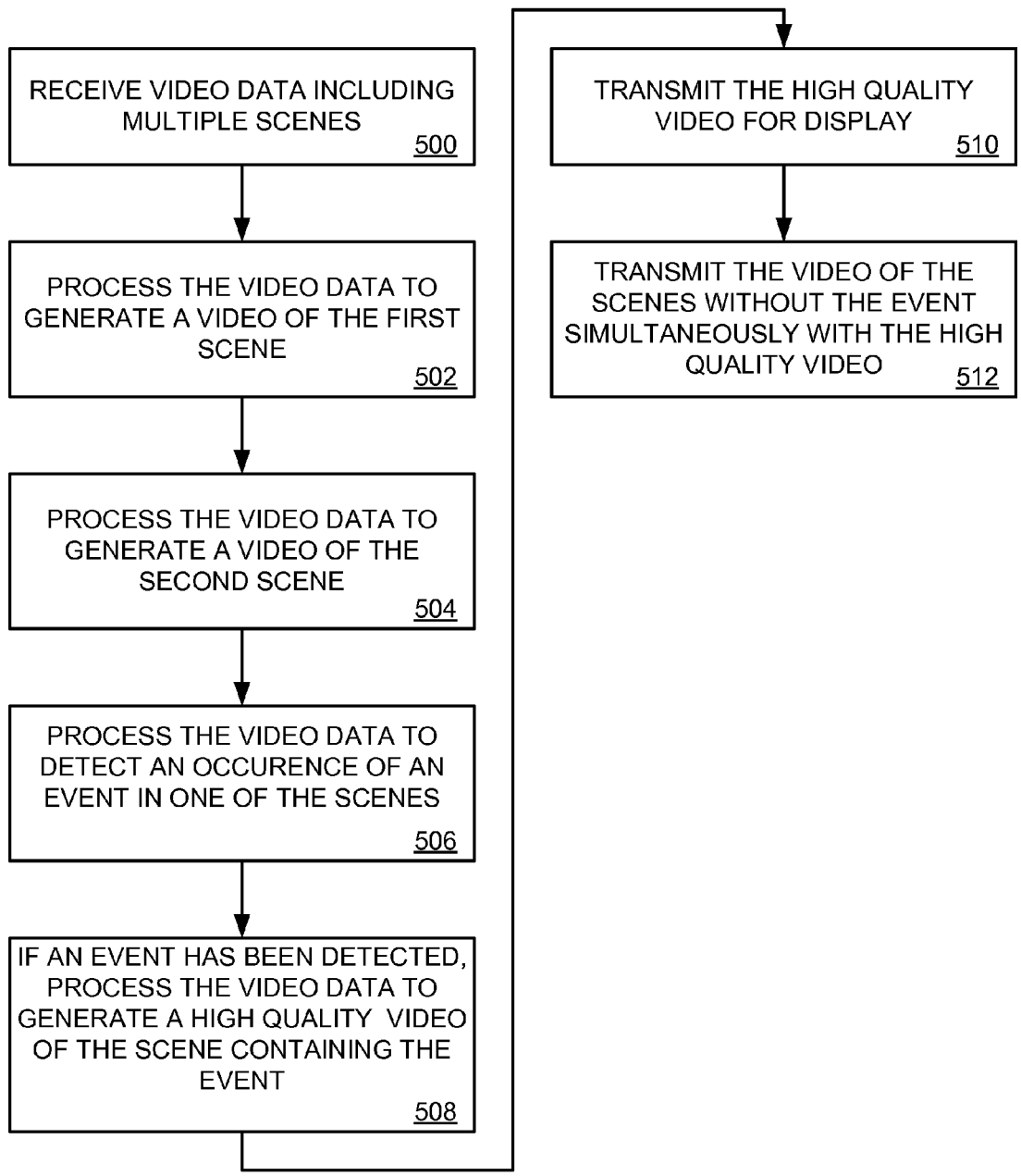
FIG. 5 is a flow diagram illustrating a method for dynamically changing quality levels among a plurality of video scenes.

FIG. 5 is a flow diagram illustrating a method for dynamically changing quality levels among a plurality of video scenes. In this example embodiment, video processing system 322 receives video data from video capture devices 308, 310, and 312 (operation 500). This video data includes multiple scenes, such as scenes 302, 304, and 306.

Video processing system 322 processes the video data to generate a video of the first scene at a first quality level (operation 502). Video processing system 322 also processes the video data to generate a video of the second scene at a second quality level (operation 504). The first and second quality levels may be identical in some examples.

Video processing system 322 processes the video data to detect an occurrence of an event in one of the scenes (operation 506). This event may be any of a wide variety of possible events. For example, the event may be motion within one of the scenes, the presence of an object of interest within one of the scenes, the presence of an object of interest within a selected region within one of the scenes, the absence of an object of interest within a selected region within one of the scenes, or the like. The object of interest may be anything detectable in the video such as a human, car, boat, dog, cat, or the like.

If an event has been detected, video processing system 322 processes the video data to generate a high quality video of the scene containing the event (operation 508) transmits the high quality video to display 326 for display (operation 510). Quality levels may be determined in any of a wide variety of ways and may include any of a variety of different manifestations of quality. For example, low quality video may be video that has a high scale or compression level, while high quality video has a much lower scale or compression level. In other examples, low quality video may have a different color map than high quality video, as in the case where low quality video is transmitted in black and white, while high quality video is transmitted in color. Still other examples may include low quality video having a low frame rate, while high quality video has a higher frame rate. In some embodiments multiple manifestations of quality may be used within a single system. For example, high quality video may have both a higher frame rate and a lower compression ratio that low quality video.

Simultaneous with the transmission of the high quality video to display 326, video processing system 322 continues to transmit the videos of the scenes not containing the event at their original quality levels (operation 512).

In some example embodiments, video capture devices 308, 310, and 312 may process the video data to generate video of the first scene having a first quality level, and to generate video of the second scene having a second quality level (operations 502 and 504). When an event has been detected by video processing system 322, it may send control signals to video capture devices 308, 310, and 312 instructing the device capturing video data of the scene containing the event to process the video data to generate video of the scene having a high quality level. For example, in normal operation, video capture devices 308, 310, and 312 may all capture video of their respective scenes at a low quality level. When video processing system 322 detects an event in one of the scenes, it may send a control signal to one of the video capture devices instructing it to begin capturing video of its scene at a high quality level.

Figure 6:
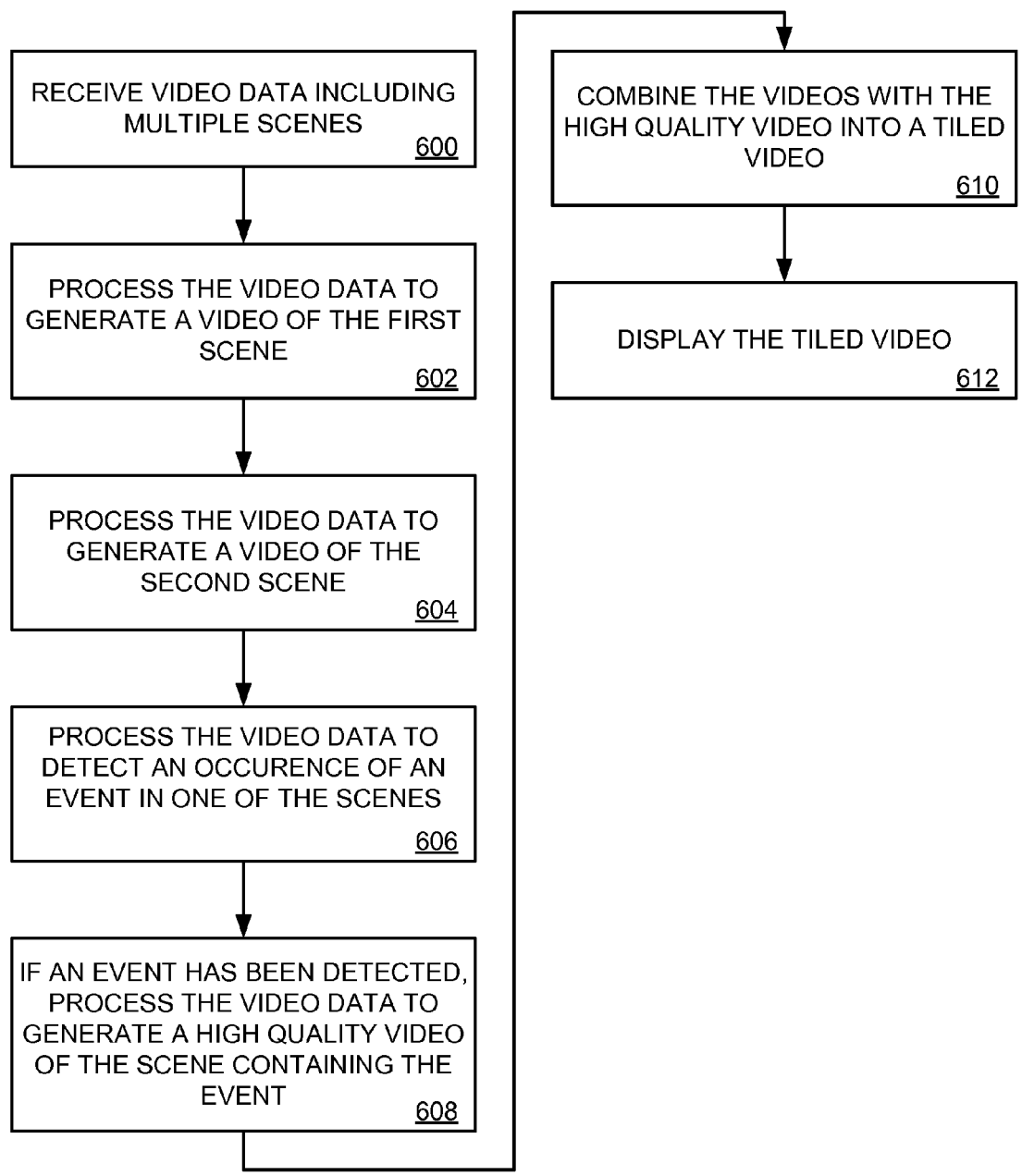
FIG. 6 is a flow diagram illustrating a method for dynamically changing quality levels among a plurality of video scenes.

FIG. 6 is a flow diagram illustrating a method for dynamically changing quality levels among a plurality of video scenes. In this example embodiment, video processing system 322 receives video data from video capture devices 308, 310, and 312 (operation 600). This video data includes multiple scenes, such as scenes 302, 304, and 306 in this example.

Video processing system 322 processes the video data to generate a video of the first scene at a first quality level (operation 602). Video processing system 322 also processes the video data to generate a video of the second scene at a second quality level (operation 604). The first and second quality levels may be identical in some examples.

Video processing system 322 processes the video data to detect an occurrence of an event in one of the scenes (operation 606). This event may be any of a wide variety of possible events. For example, the event may be motion within one of the scenes, the presence of an object of interest within one of the scenes, the presence of an object of interest within a selected region within one of the scenes, the absence of an object of interest within a selected region within one of the scenes, or the like. The object of interest may be anything detectable in the video such as a human, car, boat, dog, cat, or the like.

If an event has been detected, video processing system 322 processes the video data to generate a high quality video of the scene containing the event (operation 608). Quality levels may be determined in any of a wide variety of ways and may include any of a variety of different manifestations of quality. For example, low quality video may be video that has a high scale or compression level, while high quality video has a much lower scale or compression level. In other examples, low quality video may have a different color map than high quality video, as in the case where low quality video is transmitted in black and white, while high quality video is transmitted in color. Still other examples may include low quality video having a low frame rate, while high quality video has a higher frame rate. In some embodiments multiple manifestations of quality may be used within a single system. For example, high quality video may have both a higher frame rate and a lower compression ratio that low quality video.

Figure 9:
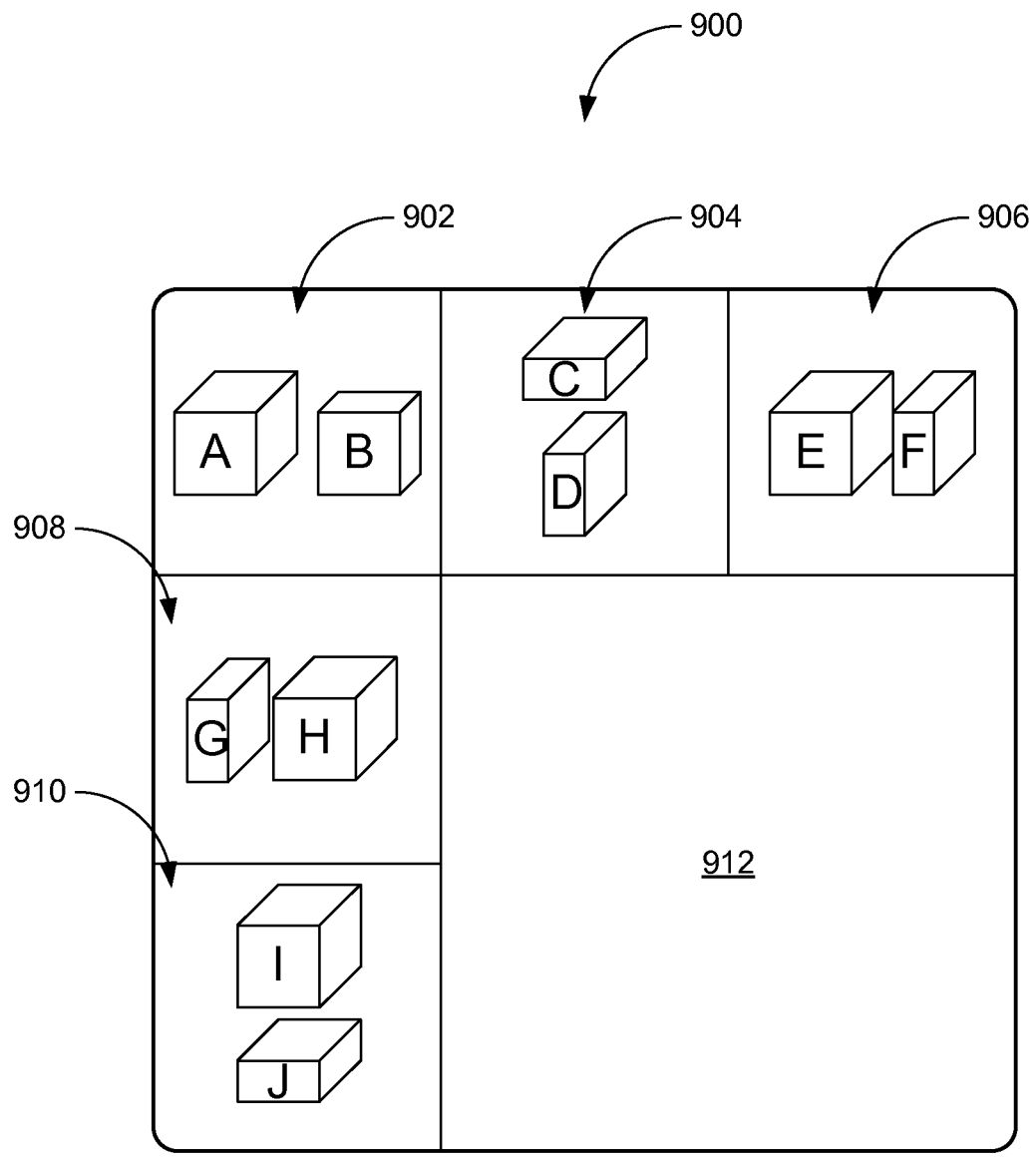
FIG. 9 is an illustration of a first example video display in a video processing system for dynamically changing quality levels among a plurality of video scenes.
Figure 10:
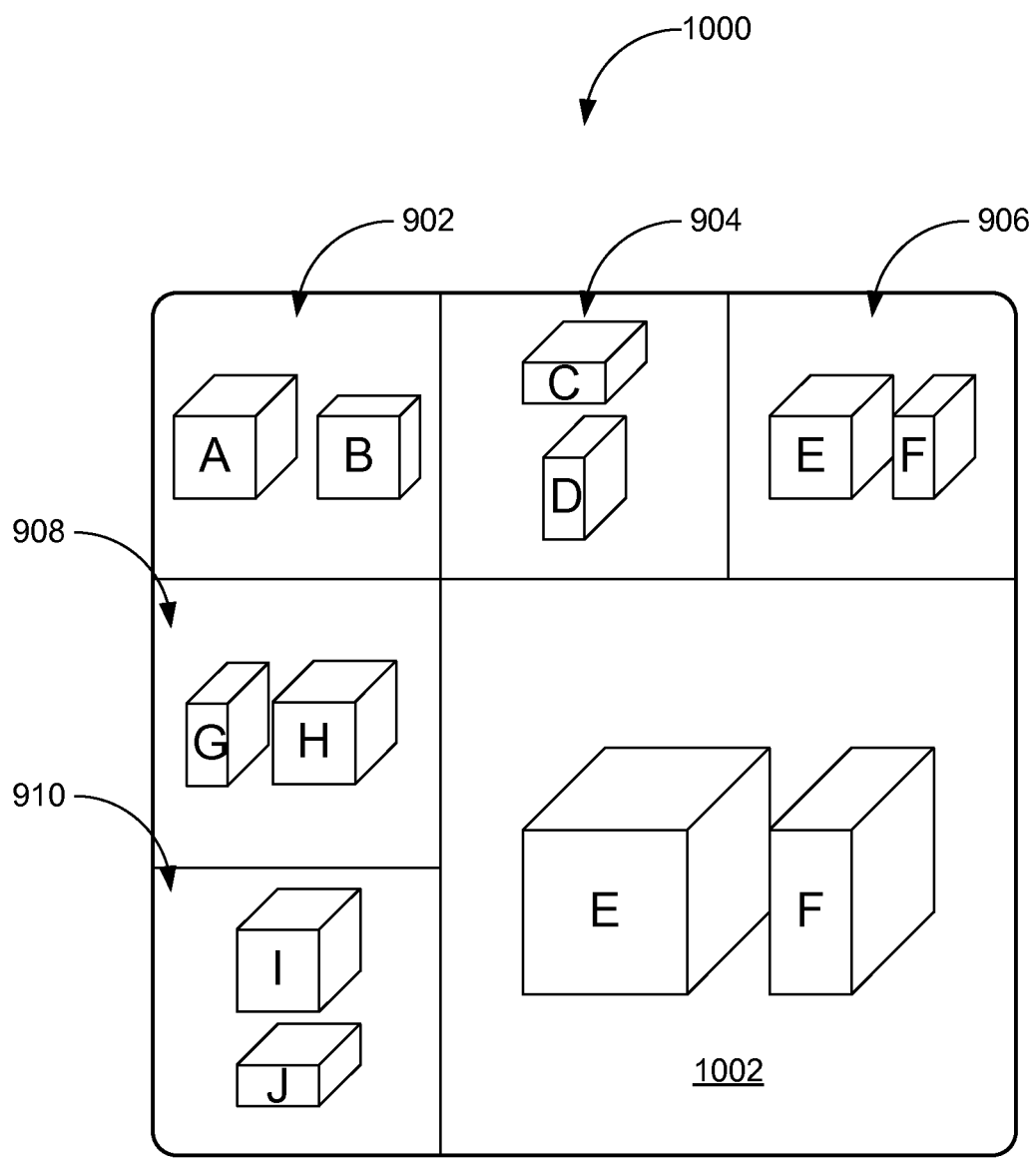
FIG. 10 is an illustration of a second example video display in a video processing system for dynamically changing quality levels among a plurality of video scenes.
Figure 11:
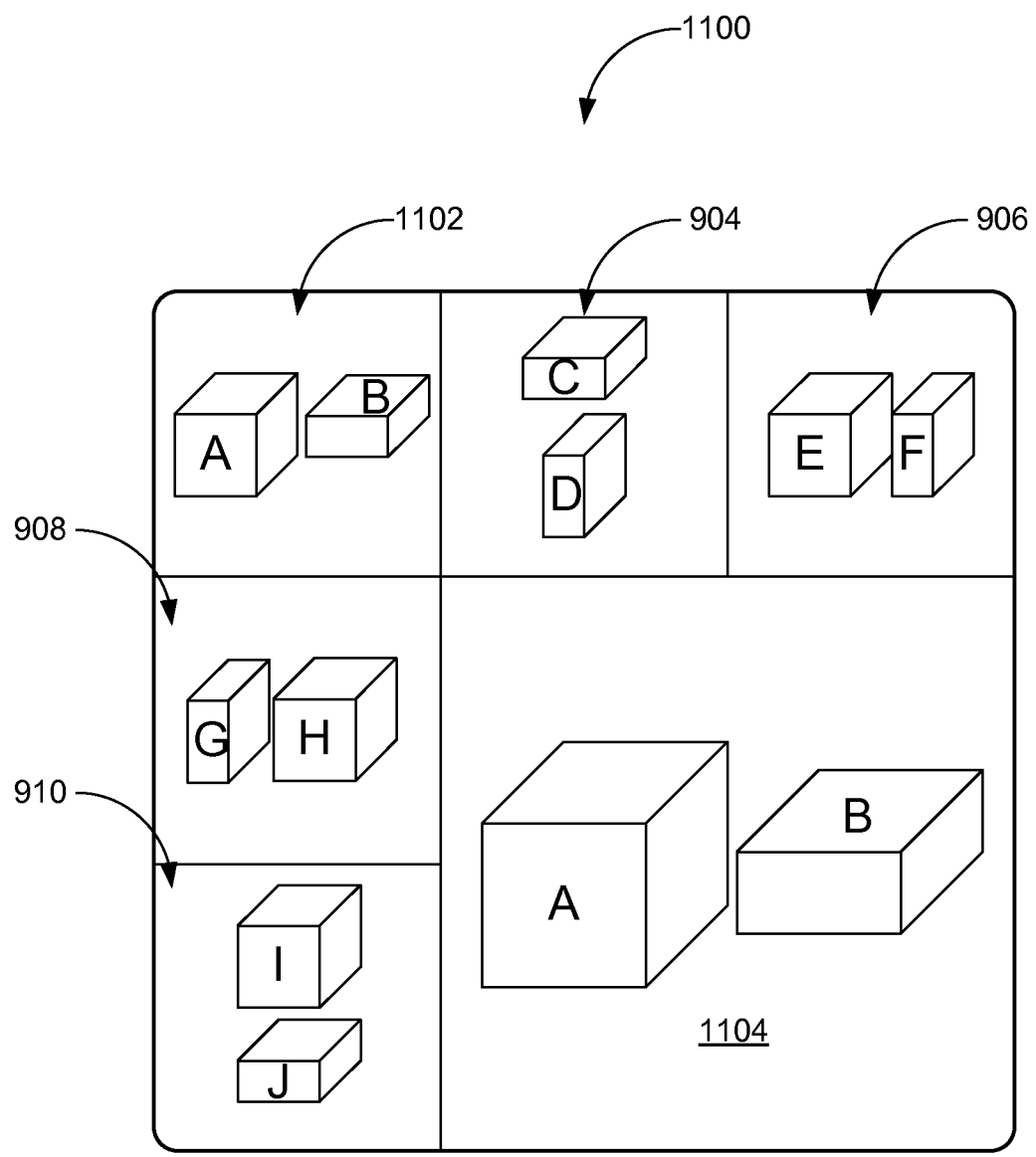
FIG. 11 is an illustration of a third example video display in a video processing system for dynamically changing quality levels among a plurality of video scenes.

Video processing system 322 then combines the low quality videos with the high quality video into a tiled video (operation 610), and transmits the tiled video of the scenes including both the low quality videos and the high quality video to display 326 (operation 512). Examples of a tiled video are illustrated in FIGS. 9 through 11 and described below.

In some example embodiments, video capture devices 308, 310, and 312 may process the video data to generate video of the first scene having a first quality level, and to generate video of the second scene having a second quality level (operations 602 and 604). When an event has been detected by video processing system 322, it may send control signals to video capture devices 308, 310, and 312 instructing the device capturing video data of the scene containing the event to process the video data to generate video of the scene having a high quality level. For example, in normal operation, video capture devices 308, 310, and 312 may all capture video of their respective scenes at a low quality level. When video processing system 322 detects an event in one of the scenes, it may send a control signal to one of the video capture devices instructing it to begin capturing video of its scene at a higher quality level.

Figure 7:
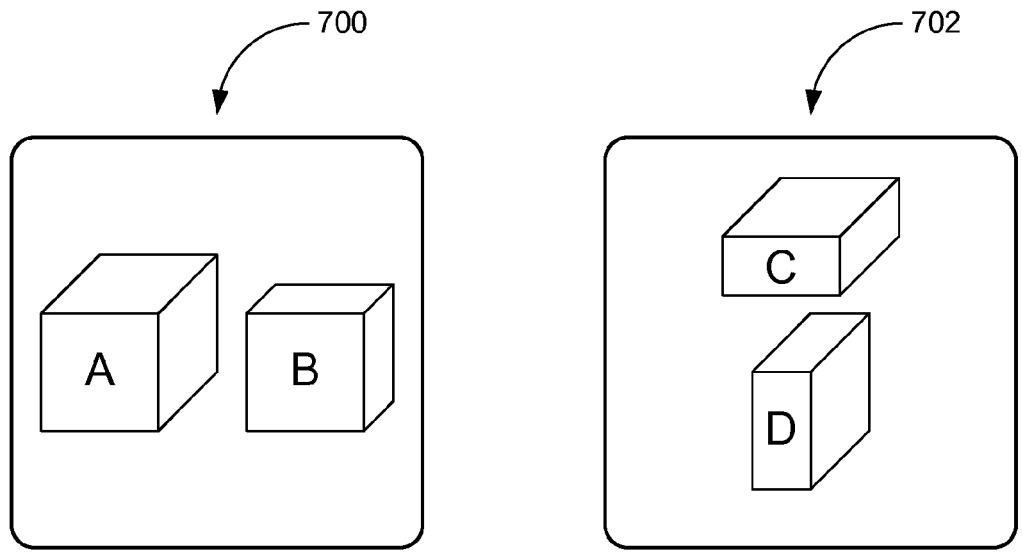
FIG. 7 is an illustration of a first example video image of two scenes from a video used by a video processing system to dynamically change quality levels among a plurality of video scenes.

FIG. 7 is an illustration of a first example video data of two scenes from a video used by a video processing system to dynamically change quality levels among a plurality of video scenes. This example video data contains two scenes. Scene 700 includes object A and object B. Scene 702 includes object C and object D.

Figure 8:
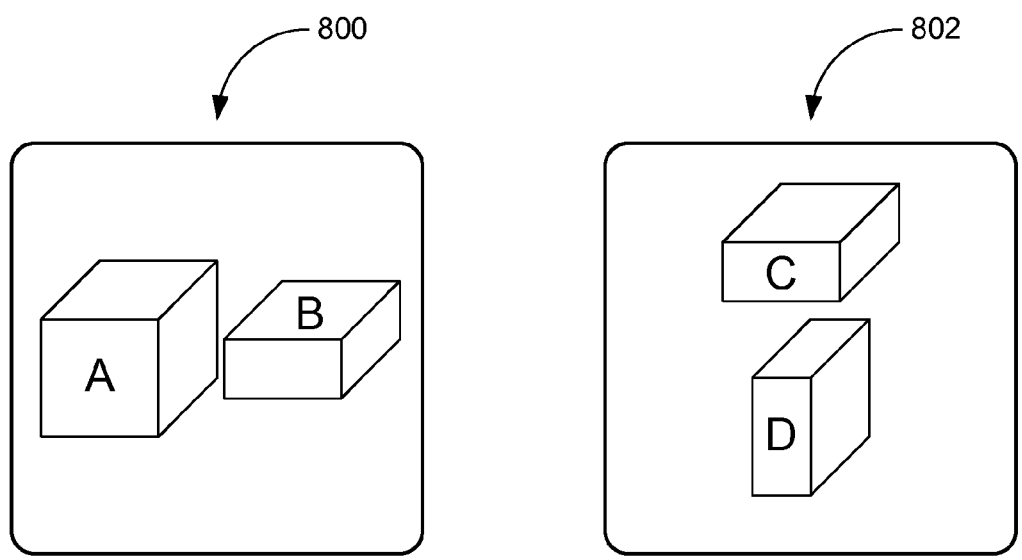
FIG. 8 is an illustration of a second example video image of two scenes from a video used by a video processing system to dynamically change quality levels among a plurality of video scenes.

FIG. 8 is an illustration of a second example video data of two scenes from a video used by a video processing system to dynamically change quality levels among a plurality of video scenes. FIG. 8 illustrates the two scenes from FIG. 7 when an event has occurred in one of the scenes. In this example, scene 802 is identical to scene 702, so no event has been detected in scene 802. However, in scene 800, object B has rotated from its position in scene 700. This occurrence of an event may be detected by video processing system 322.

FIG. 9 is an illustration of a first example video display in a video processing system for dynamically changing quality levels among a plurality of video scenes. In this example, five scenes are tiled together into a single video 900 for display. Scene 902 is located in an upper-left quadrant of the display, scene 904 is located in an upper-middle quadrant of the display, scene 906 is located in an upper-right quadrant of the display, scene 908 is located in a middle-left quadrant of the display, and scene 910 is located in a lower-left quadrant of the display. In this example, scene 902 identical to scene 702 and includes objects A and B, while scene 904 is identical to scene 704 and includes objects C and D. Scene 906 includes objects E and F, scene 908 includes objects G and H, and scene 910 includes objects I and J. High quality quadrant 912 of the display currently is empty. This quadrant may be considered of a higher quality than the other quadrants due to its decreased compression level, larger color map, faster frame rate, or any other aspect of video quality.

FIG. 10 is an illustration of a second example video display in a video processing system for dynamically changing quality levels among a plurality of video scenes. The video 1000 of FIG. 10 is identical to the video 900 of FIG. 9, except that scene 906 is now displayed in the high quality quadrant 1002.

FIG. 11 is an illustration of a third example video display in a video processing system for dynamically changing quality levels among a plurality of video scenes. The video 1100 of FIG. 11 is representative of the change that would occur to the video 1000 of FIG. 10 when an event is detected in scene 902 located in the upper-left quadrant of the display. In this example, scene 1102 now shows that object B within scene 902 has rotated and this event has been detected by video processing system 322. Scene 1102 has now been generated with a high quality level and the resulting high quality video of scene 1102 is now displayed in high quality quadrant 1104 of the display. As discussed above, this high quality level may take any of a variety of forms including decreased compression level, larger color map, higher frame rate or the like. Optionally, the low quality video of scene 1102 may continue to be displayed in the upper-left quadrant of the display while the high quality video is tiled into the high quality quadrant of the display.

One should note that the flowcharts included herein show the architecture, functionality, and/or operation of a possible implementation of software. In this regard, each block can be interpreted to represent a module, segment, or portion of code, which includes one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured media.

It should be emphasized that the above-described embodiments are merely possible examples of implementations, merely set forth for a clear understanding of the principles of this disclosure. Many variations and modifications may be made to the above-described embodiments without departing substantially from the principles of the disclosure. All such modifications and variations are intended to be included herein within the scope of this disclosure.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a video processing system, the method comprising:
    receiving video data comprising a first scene and a second scene from a video capture device;
    processing at least a first portion of the video data to generate a first video comprising the first scene and having a first quality level in the video processing system;
    processing at least a second portion of the video data to generate a second video comprising the second scene and having a second quality level in the video processing system;
    processing at least a third portion of the video data to detect an occurrence of an event in the first scene in the video processing system;
    in response to detecting the occurrence of the event in the first scene, processing at least a fourth portion of the video data to generate a third video comprising the first scene and having a third quality level in the video processing system, wherein the third quality level is different than the first quality level;
    combining the first video at the first quality level, the second video at the second quality level, and the third video at the third quality level into a tiled video in the video processing system, wherein the first video and second video have a first size and the third video has a second size, wherein the second size is larger than the first size; and
    transferring the tiled video for display.

2. The method of claim 1, further comprising:
    transferring the second video for display simultaneously with transferring the third video for display.

3. The method of claim 1,
    wherein the first quality level comprises a first compression level, the second quality level comprises a second compression level, and the third quality level comprises a third compression level; and wherein the third compression level is less than the first compression level.

4. The method of claim 1,
wherein the first quality level comprises a first frame rate, the second quality level comprises a second frame rate, and the third quality level comprises a third frame rate; and
wherein the third frame rate is greater than the first frame rate.

5. The method of claim 1,
wherein the first quality level comprises a first color space, the second quality level comprises a second color space, and the third quality level comprises a third color space; and
wherein the third color space is larger than the first color space.

6. The method of claim 1,
wherein the first event is motion within the first scene.

7. The method of claim 1,
wherein the first event is a presence of an object of interest within the first scene.

8. The method of claim 1,
wherein the first event is a presence of an object of interest within a selected region within the first scene.

9. The method of claim 1,
wherein the first event is an absence of an object of interest within a selected region within the first scene.

10. A video processing system comprising:
a communication interface configured to receive video data comprising a first scene and a second scene; and
a processor configured to:
process at least a first portion of the video data to generate a first video comprising the first scene and having a first quality level;
process at least a second portion of the video data to generate a second video comprising the second scene and having a second quality level;
process at least a third portion of the video data to detect an occurrence of an event in the first scene;
in response to detecting the occurrence of the event in the first scene, process at least a fourth portion of the video data to generate a third video comprising the first scene and having a third quality level, wherein the third quality level is different than the first quality level;
combine the first video at the first quality level, the second video at the second quality level, and third video at the third quality level into a tiled video, wherein the first and second videos have a first size, and the third video has a second size, wherein the second size is larger than the first size; and
transfer the tiled video through the communication interface for display.

11. The video processing system of claim 10, wherein the processor is also configured to transfer the second video through the communication interface for display simultaneously with transferring the third video through the communication interface for display.

12. The video processing system of claim 10,
wherein the first quality level comprises a first compression level, the second quality level comprises a second compression level, and the third quality level comprises a third compression level; and
wherein the third compression level is less than the first compression level.

13. The video processing system of claim 10,
wherein the first quality level comprises a first frame rate, the second quality level comprises a second frame rate, and the third quality level comprises a third frame rate; and
wherein the third frame rate is greater than the first frame rate.

14. The video processing system of claim 10,
wherein the first quality level comprises a first color space, the second quality level comprises a second color space, and the third quality level comprises a third color space; and
wherein the third color space is larger than the first color space.

15. The video processing system of claim 10,
wherein the first event is motion within the first scene.

16. The video processing system of claim 10,
wherein the first event is a presence of an object of interest within the first scene.

17. The video processing system of claim 10,
wherein the first event is a presence of an object of interest within a selected region within the first scene.

18. The video processing system of claim 10,
wherein the first event is an absence of an object of interest within a selected region within the first scene.

* * * * *